United States Patent
Miller, III et al.

[11] Patent Number: 6,145,881
[45] Date of Patent: Nov. 14, 2000

[54] SEATBACK MOUNTED SEAT BELT TENSIONER

[75] Inventors: H. John Miller, III, Macomb Township, Macomb County; Lynette Norgan-Curtiss, Novi; Douglas L. Forsyth, Sterling Heights, all of Mich.

[73] Assignee: Breed Automotive Technology Inc., Lakeland, Fla.

[21] Appl. No.: 09/232,342

[22] Filed: Jan. 15, 1999

[51] Int. Cl.[7] .................................................. B60R 22/36
[52] U.S. Cl. ..................... 280/806; 280/801.2; 280/808
[58] Field of Search ............................. 280/801.2, 806, 280/808

[56] References Cited

U.S. PATENT DOCUMENTS

| | | | |
|---|---|---|---|
| 3,982,775 | 9/1976 | Lindblad | 280/806 |
| 4,023,427 | 5/1977 | Beier | 74/242.1 FP |
| 4,597,545 | 7/1986 | Burghardt | 242/107.2 |
| 4,615,540 | 10/1986 | Sedlmayr et al. | 280/806 |
| 5,346,152 | 9/1994 | Föhl | 242/371 |
| 5,366,245 | 11/1994 | Lane, Jr. | 280/806 |
| 5,374,110 | 12/1994 | Hiramatsu | 297/480 |
| 5,411,291 | 5/1995 | Föhl | 280/806 |
| 5,431,448 | 7/1995 | Ball et al. | 280/801.2 |
| 5,481,940 | 1/1996 | Betz | 74/502.6 |
| 5,487,563 | 1/1996 | Hiramatsu | 280/806 |
| 5,671,894 | 9/1997 | Dybro et al. | 242/374 |
| 5,676,397 | 10/1997 | Bauer | 280/806 |
| 5,749,601 | 5/1998 | Knoll et al. | 280/808 |
| 5,823,627 | 10/1998 | Viano et al. | 280/808 |

*Primary Examiner*—Kenneth R. Rice
*Attorney, Agent, or Firm*—Markell Seitzman

[57] ABSTRACT

A pyrotechnic piston and cylinder assembly raises a belt guide, pulling two segments of a safety belt upwardly away from a vehicle seat. The extension of the two segments removes slack from the safety belt. After the piston is fully extended, a pair of wedges jam an inner wall of the cylinder, providing resistance to the retraction of the shaft into the cylinder. As the belt forces overcome the resistance from the wedges, the piston is pushed back into the cylinder and a portion of belt is permitted to extend, relieving tension in the safety belt. The wedges plastically deform the inner wall of the cylinder, thereby absorbing a portion of the energy of the collision.

14 Claims, 6 Drawing Sheets

SEATBACK MOUNTED SEAT BELT TENSIONER

BACKGROUND AND SUMMARY OF THE INVENTION

The present invention relates generally to seat belt safety systems and particularly to safety systems having integrated belt pretensioners or belt tighteners.

If a vehicle collision occurs, injury to the vehicle occupant can be reduced through the use of safety belts which restrain the occupant and reduce the acceleration experienced by a vehicle seat occupant. Within the automotive industry, extensive testing has resulted in a series of design parameters which correlate maximum acceleration and jerk (acceleration per unit time) with injury thresholds. These parameters provide the basis for designing safety equipment such as seat belts and air bags, which limit maximum acceleration and jerk to levels which are survivable or less injurious to the occupant.

Safety belts are typically manufactured to deform and absorb energy under load. This deformation takes place by a stretching of the belt material when tension is applied. During a crash a vehicle occupant's body is decelerated by the seat belts, thereby restraining the forward motion of the occupant. Stretching of the belt absorbs a portion of the seat occupant's kinetic energy and allows the deceleration forces applied to the occupant's body to extend over a longer period of time. By increasing the time over which the deceleration forces are applied to the occupant, belt stretching decreases the levels of force applied to the occupant.

While belt stretching alone does reduce the acceleration forces experienced by a seat occupant, it is desirable to further reduce the acceleration forces by extending the period of time over which restraining forces act.

The duration of belt force action can be extended in two ways: first by applying restraining forces earlier in a collision, and second by permitting the restraining forces to extend for a longer time after the collision begins. Seat belts, however, do not begin to restrain the occupant until the occupant has been thrown forward into the belt. To rapidly remove belt slack, seat belt pretensioners have been developed which remove slack from the belts before the occupant moves significantly due to the crash-induced acceleration. While there are various techniques for extending the duration of the restraining forces after the collision, there is a limited range of forward travel before the occupant impacts some portion of the vehicle. Hence, seat belts must complete their task before the occupant's body travels too close to a portion of the vehicle, such as the dashboard, the steering wheel, or the windshield.

Safety belt pretensioners extend the deceleration time by removing slack from the belt early in a collision. Pretensioners typically remove slack by retracting a segment of belt before the occupant's body mass accelerates forward into the belt. Since the belt system is pulled tight around the seat occupant before the occupant's body can accelerate forward, the restraining forces begin to decelerate the occupant earlier in the collision.

Various types of pretensioners are known. For example, rotary pretensioners rapidly wrap a segment of belt onto a spool. Linear pretensioners, on the other hand, displace a segment of belt linearly along the belt path.

The pretensioner is typically located at one of the attachment points of a conventional three-point safety belt. The conventional safety belt comprises a lap belt and shoulder belt which attach to the vehicle at three points. The lap belt typically attaches at the outboard side of the vehicle seat, below and to the rear of the seat occupant. The end of the lap belt defines the first attachment point. The lap belt extends across the lap portion of the seat to the buckle. The buckle and associated tongue define the second attachment point. The shoulder belt typically is secured at the buckle (or slides through the buckle) and extends upward diagonally across the occupant's torso and over the occupant's shoulder, bends around a shoulder belt guide and extends downwardly to the third attachment point, typically the retractor. The belt guide may be mounted to the top portion of the vehicle seat or to the vehicle body structure at the B-pillar or C-pillar.

In the retractor, the belt is typically wound around a spool which rotates about an axis. When a collision occurs, the belt retractor will lock, preventing the seat belt from protracting from the spool. The retractor typically includes a vehicle sensor which causes the retractor to lock when the vehicle is subjected to decelerative levels above a pre-determined amount. The retractor is also locked by operation of a web sensor when the seat belt webbing is pulled from the spool at a level that exceeds a predetermined amount.

Pretensioners typically include a piston and cylinder assembly driven by a pyrotechnic device. The piston and cylinder assembly includes a combustion chamber, next to which the pyrotechnic gas generator is mounted. The pyrotechnic device includes a quantity of material which, when ignited, creates a volume of gas which is trapped within the combustion chamber. The pressure created by the entrapped gas pushes the piston along the cylinder. The rapid and forceful piston acceleration delivered by the pyrotechnic charge makes the pyrotechnic device an attractive power source for the pretensioner.

In a linear pretensioner, the piston is typically coupled to the end of the belt so that the piston pulls the buckle which pulls on the safety belt. The piston may alternatively pull a tongue or a clutch which pulls on the safety belt. While these arrangements transfer the fall piston force to the safety belt, the amount of slack that can be removed by the pretensioner is limited to the length of the piston stroke.

Slack removal can also be obtained with a rotary pretensioner. The rotary pretensioner typically comprises a retractor geared to a pyrotechnic piston and cylinder assembly. When a collision is detected, the retractor is locked, and then an electronic control unit sends a signal to activate the pyrotechnic piston and cylinder assembly. The pyrotechnic piston and cylinder assembly drives a gear which turns the spool. The turning of the spool rewinds the belt.

Some of the slack winding capacity of rotary pretensioning devices is lost to the "feed-roll" or "spool" effect. This occurs because the belt is typically wound somewhat loosely onto the spool. When tension is applied to the belt, the portion of belt on the spool tightens, releasing a segment of belt back into the belt system.

While the gearing of a rotary pretensioner does typically remove more slack than the linear pretensioner, mechanical limitations restrict the rate at which the belt can be retracted. The retraction force available through these devices is reduced by the gearing and further limited by the load capacity of the gear components.

What is needed is a seat belt safety system with a pretensioner which removes more slack from the safety belt system and provides a greater pretensioning force.

The seat belt safety system of this invention attains greater belt pretensioning by upward movement of a shoulder belt guide. Raising the guide extends two segments of belt, one segment extending frontwardly across the seat and one segment extending downwardly into the seat. The shoulder belt guide is mounted to a piston and cylinder assembly which is integrated into a vehicle seat frame. A pyrotechnical charge drives the piston and cylinder assembly. A signal from a crash detecting logic unit activates the pyrotechnical charge, which results in the production of high pressure gas. The gas, entrapped within the cylinder, pushes on the piston so that it extends upwardly from the cylinder. The piston extension raises the shoulder belt guide. The positioning of the belt over the guide provides a mechanical advantage. Due to the mechanical advantage, the amount of belt tensioning is greater than the linear displacement of the piston. Not only is the amount of belt slack removal increased, but the rate at which the belt is retracted is also increased proportionally. The ability to rapidly remove slack from the seat belt allows the seat belt to begin loading, that is decelerating the occupant, at the maximum rate early in the crash. The result is a greater ability to reduce crash induced accelerations below a design threshold which is correlated with serious injury.

After the piston is fully extended, a pair of wedges jams the side walls of the cylinder, preventing the piston from collapsing back into the cylinder. The wedges work as a "one way clutch," permitting upward piston movement while resisting downward piston movement. A row of teeth on the wedges provides extra "bite" on the cylinder wall, thereby amplifying the jamming effect.

It is a feature of the present invention to provide a seat belt safety system which provides for faster tensioning of a safety belt.

It is an another object of the present invention to provide a seat belt safety system which delivers greater pretensioning force.

It is a further feature of the present invention to provide a seat belt safety system which removes more slack from the safety belt.

It is a still further feature of the present invention to reduce the acceleration forces experienced by a vehicle seat passenger.

It is still another feature of the present invention to absorb energy during a vehicle collision.

Further objects, features and advantages of the invention will be apparent from the following detailed description when taken in conjunction with the accompanying drawings.

DESCRIPTION OF THE PREFERRED EMBODIMENTS

Figure 1:
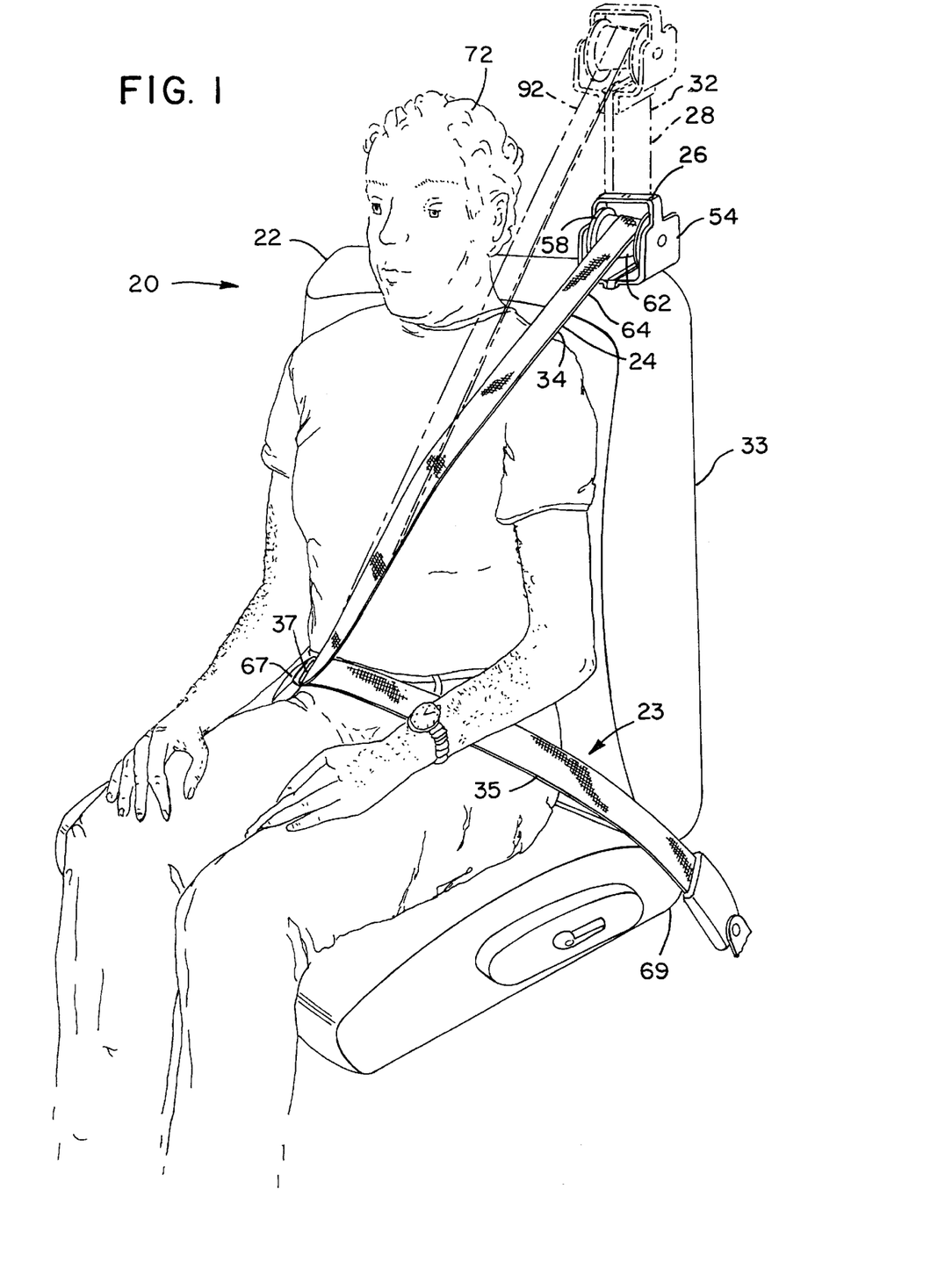
FIG. 1 is a perspective view of a vehicle seat with the seat belt safety system of this invention deployed, prior to a crash event, about a seat occupant, with the activated post-crash position of the system shown in phantom view.
Figure 2:
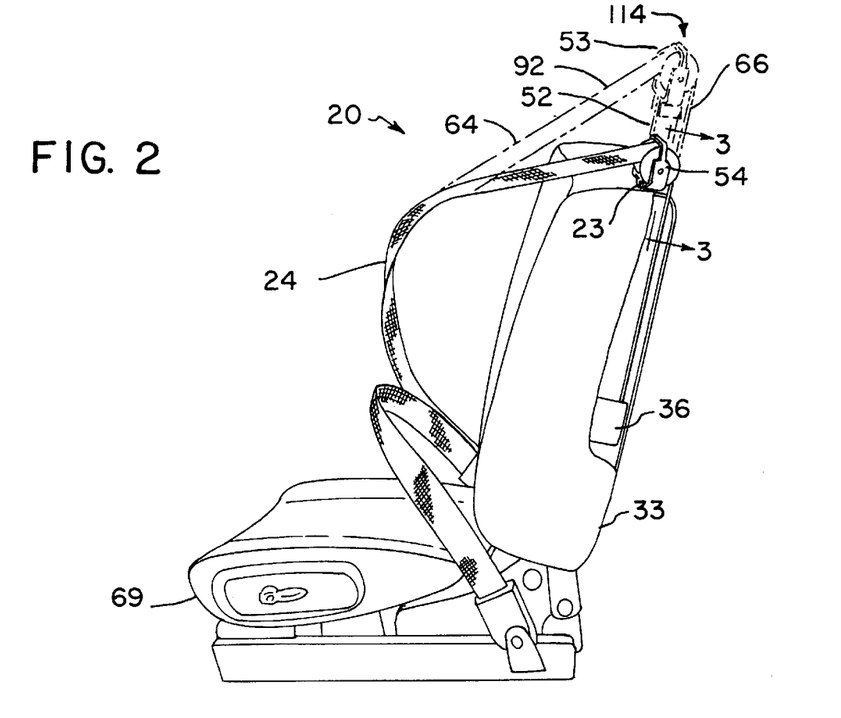
FIG. 2 is a right side elevational view of a vehicle seat belt safety system of FIG. 1.
Figure 3:
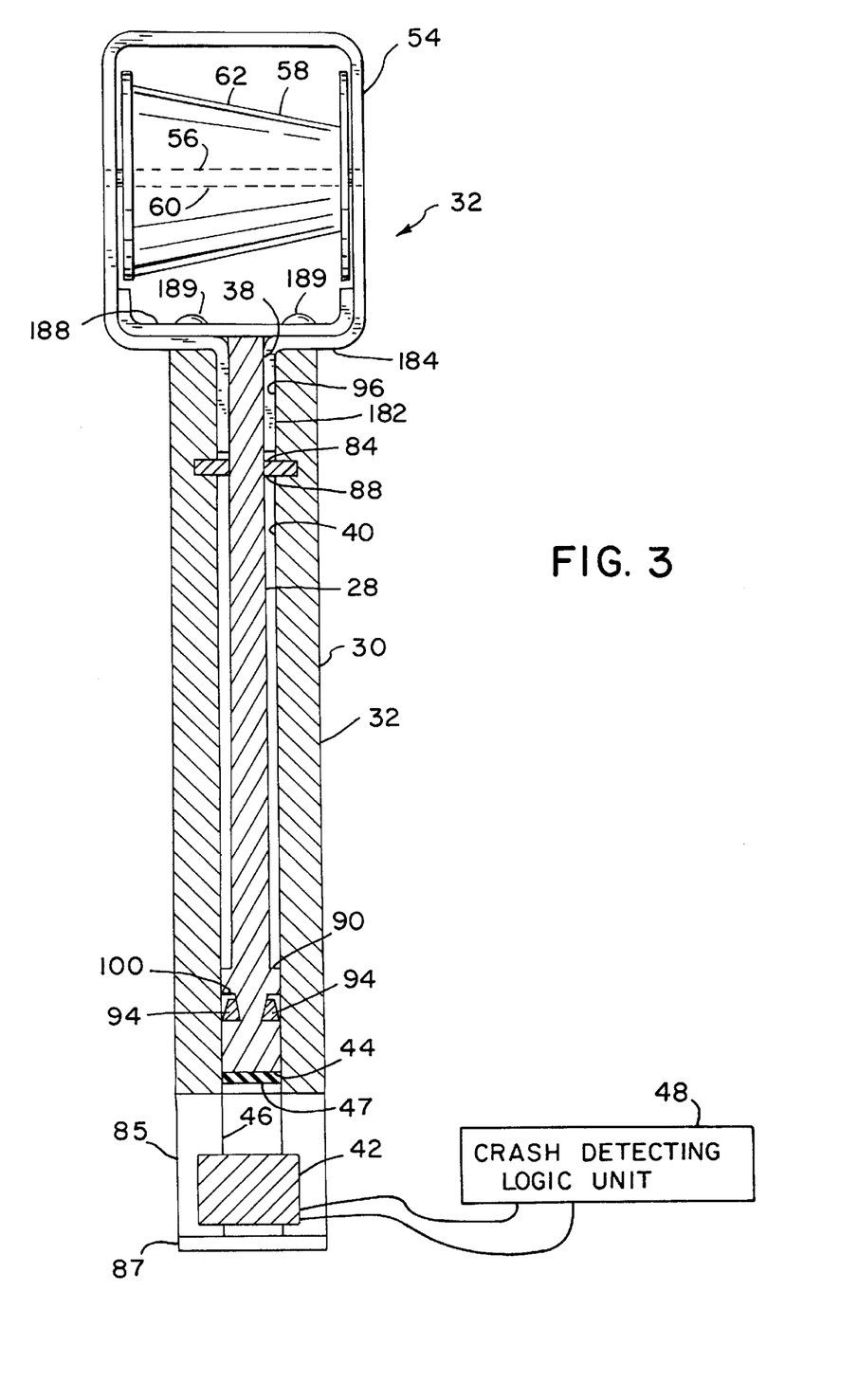
FIG. 3 is a cross-sectional view of the system of FIG. 2, taken along section line 3—3.
Figure 4:
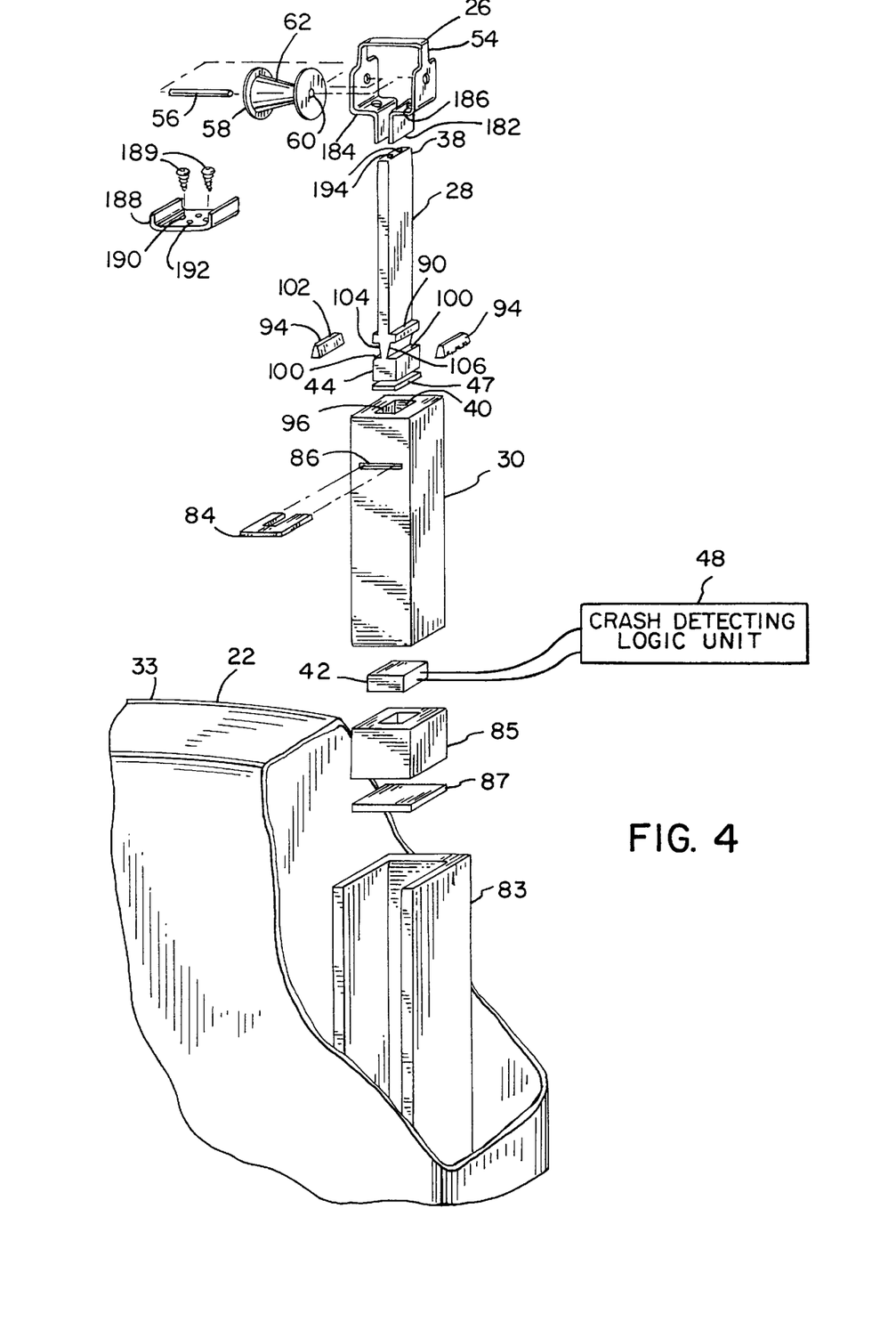
FIG. 4 is an exploded perspective view of the system of FIG. 3.

Referring more particularly to FIGS. 1–7, wherein like numbers refer to similar parts, a seat belt safety system 20 is shown in FIG. 1. The seat belt safety system 20 has a vehicle seat 22 to which a three-point safety belt system 23 is mounted. As shown in FIG. 4, a pyrotechnic piston 28 and cylinder 30 assembly 32 is mounted to a back portion 33 of the vehicle seat 22. As shown in FIG. 3, a belt guide 26 is mounted to a piston first end 38. A safety belt 24 having a shoulder portion 34 and a lap portion 35 is mounted to the vehicle seat 22. The shoulder portion 34 of the safety belt 24 extends diagonally across the front of the seat 22, over the belt guide 26, and downwardly into the seat, where it is wound onto a belt retractor 36. The lap portion 35 of the safety belt 24 extends laterally across the front of the seat 22 to a slip tongue 37 and buckle 67.

A crash detecting logic 48 unit, indicated schematically in FIG. 4, determines whether the pyrotechnic piston and cylinder assembly 32 should be activated. When a crash is detected, the retractor 36 locks, preventing unwinding of the belt 24. Upon activation, the piston 28 and belt guide 26 are pushed upwardly, pulling the safety belt 24 upwardly to remove slack from the shoulder portion 34 of the belt. Slack in the lap portion 35 of the belt is pulled through the slip tongue 37, so that both the shoulder portion 34 and lap portion 35 of the belt are tightened simultaneously.

Figure 5:
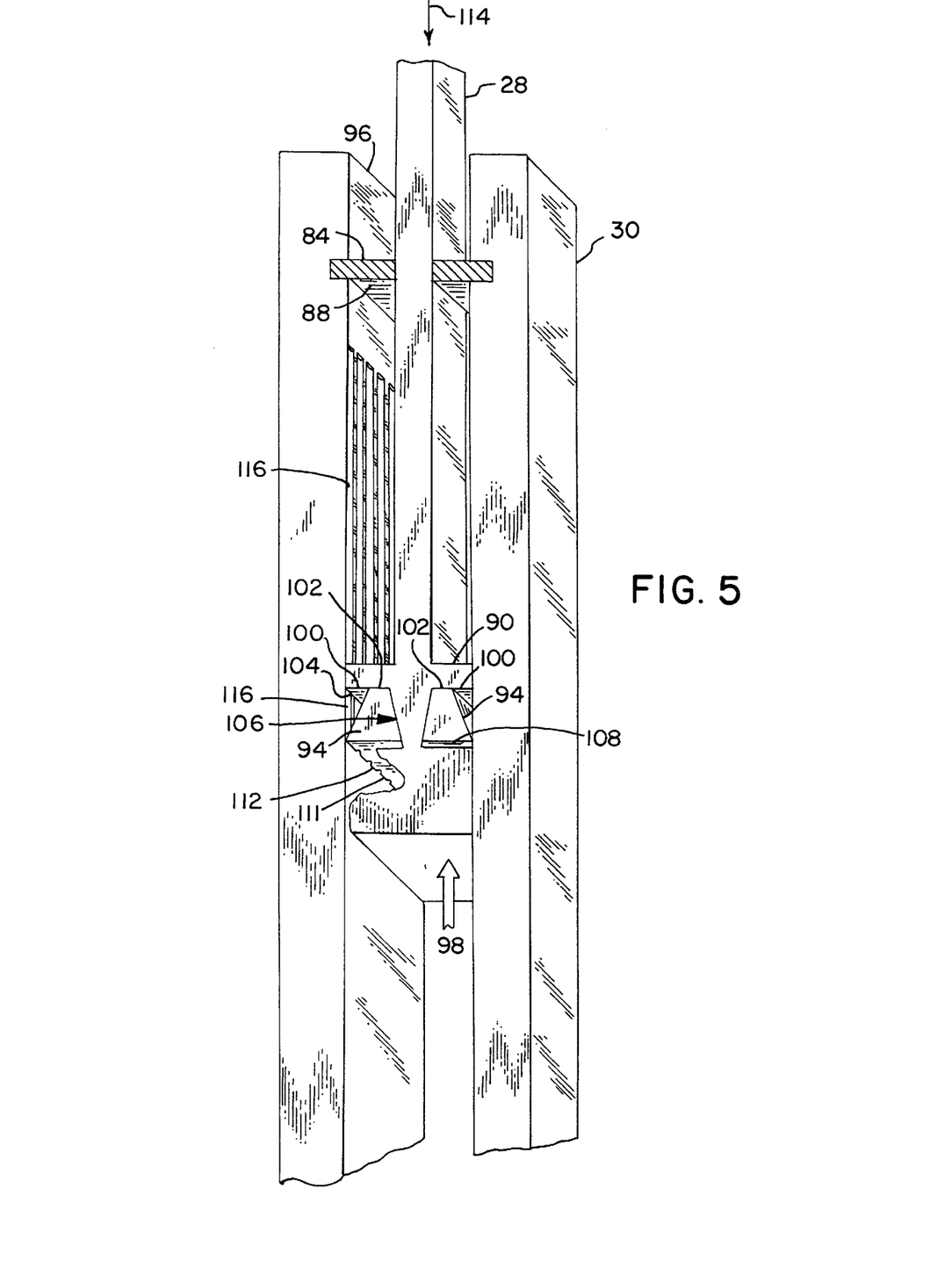
FIG. 5 is an axonometric view, partially cut away in section, of the assembly of FIG. 2, showing the jam wedges cutting grooves into the cylinder wall as the piston travels down the cylinder.

Once fully extended, collapse of the piston 28 is prevented by a pair of wedges 94, shown in FIG. 5, which engage the inner wall 96 of the cylinder 30. The wedges operate as a "one-way clutch," permitting upward extension of the piston 28 but preventing downward movement of the piston. Preventing collapse of the piston 28 into the cylinder 30 avoids the reintroduction of slack into the safety belt system 20.

The automotive industry has developed models of crash-induced loads which are designed to correlate serious bodily injury with certain levels of crash-induced loads. These models allow correlating test data from crashes employing crash dummies with a likelihood of injury to an actual automobile passenger 72. Such industry-developed models provide design targets which, if met, should improve overall effectiveness of safety systems. The present invention provides an additional tool to manage the acceleration loads imposed on a seat occupant 72 during a collision.

Figure 6:
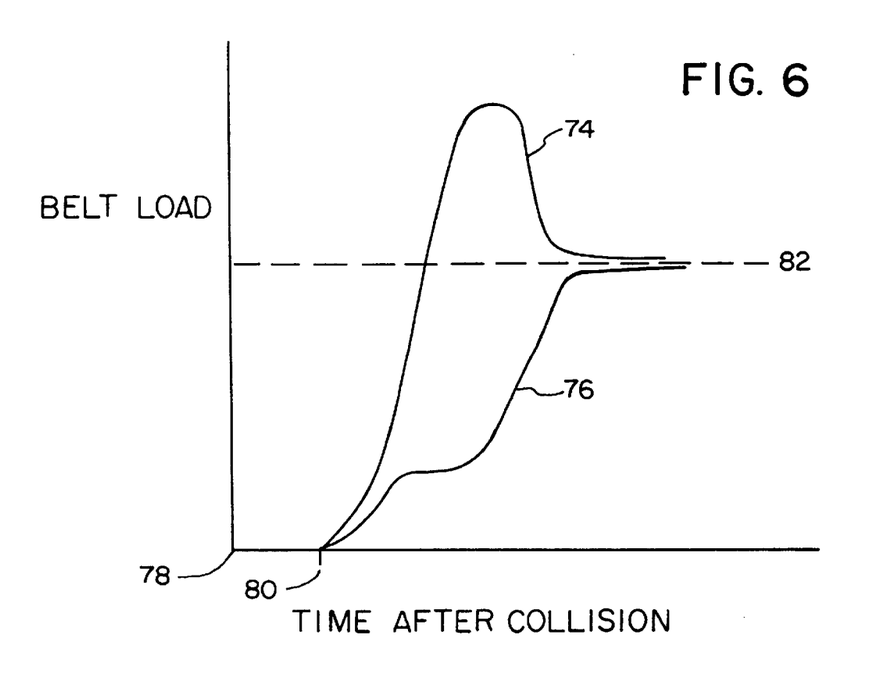
FIG. 6 is a graph of belt force plotted against time, showing the belt loading caused by a pretensioner of this invention.
Figure 7:
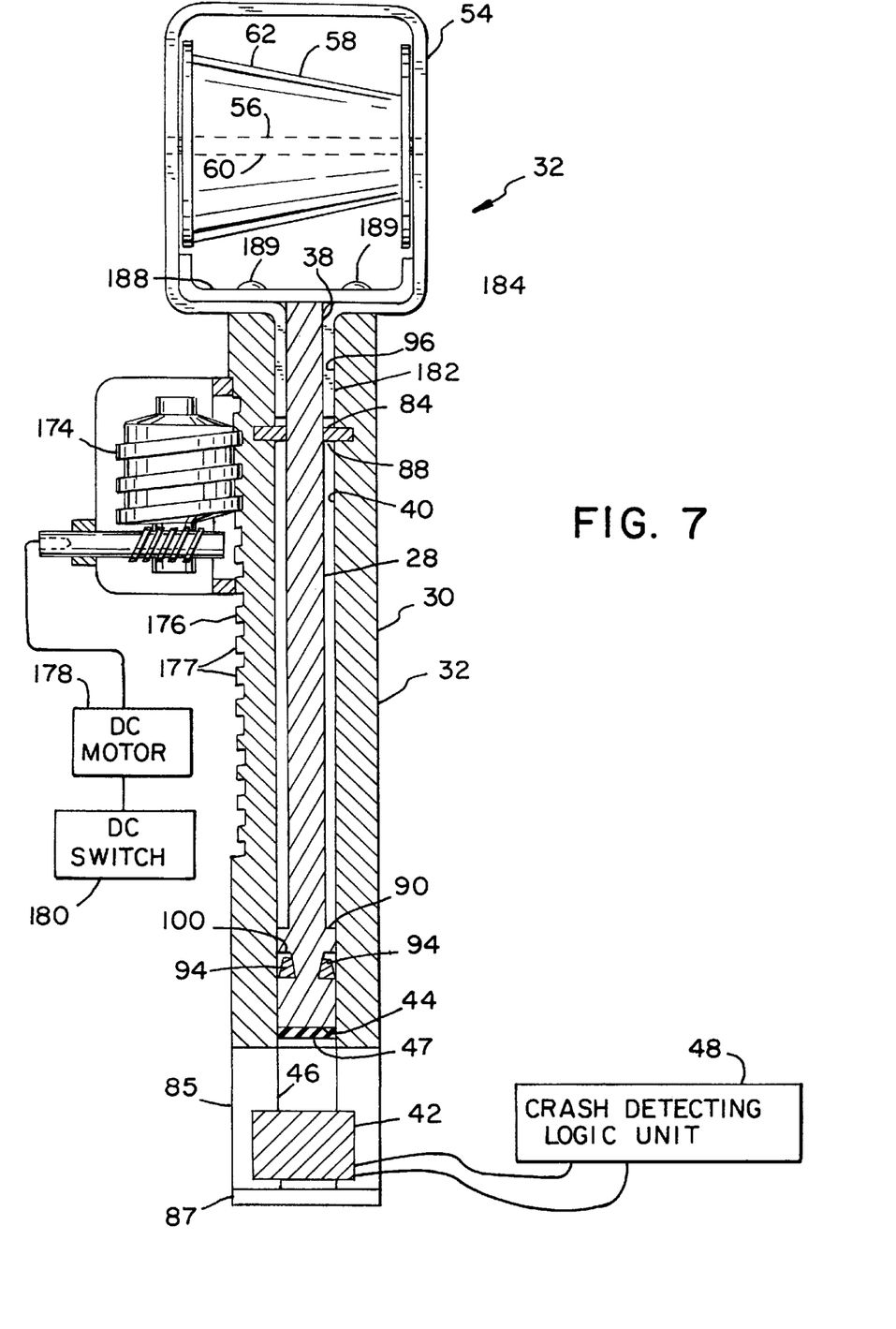
FIG. 7 is a cross-sectional view of an alternative embodiment system of this invention having an adjustable height belt spool.

Referring to FIG. 6, which shows belt load plotted against time after collision, the seat belt safety system 20 of the present invention provides quicker activation, more belt retraction, and more pretensioning force than a pretensioner acting on a single segment of belt at one of the three attachment points. The load line 74 shows the pretensioning capacity of the seat belt safety system 20 compared to a prior art load line 76. The collision occurs at point 78 and detection occurs at point 80. The increased capacity to apply pretensioning force is reflected by the steeper slope of the belt load line 74. The seat belt safety system 20 extends the piston 28 to pretension the belt beyond the target belt load 82, and then the belt load 74 tapers back down toward the target load as the stretching of the belt relieves belt tension.

Seat belt pretensioning rarely reaches the maximal desired belt load due to slack in the belt and stretching of the belt. If load limiting is provided by a separate mechanism, this will also limit maximum load during the pretensioning phase of a crash. Load limiting is typically performed by a separate mechanism because the load-limiting stroke is typically greater than the belt tightening stroke.

The application of larger restraining forces to the occupant early in the collision enables the reduction of acceleration forces on the occupant later in the collision.

The assembly 32 is driven by a pyrotechnic charge 42 which is secured to the cylinder housing 30 beneath the piston 28. As shown in FIG. 3, the cylinder housing 30 has portions defining a piston cavity 40, into which the piston 28 is slidably disposed. The pyrotechnic charge 42 is secured within the piston cavity 40, spaced from a piston second end 44 which defines a combustion chamber 46. A rubber seal 47 is secured to the piston second end 44 to contain the combustion products within the combustion chamber. The seal 47 may be made of a material known as Viton. The pyrotechnic charge 42 will typically be secured in place by a retainer 85 and mounting plate 87. In order to withstand the collision loads, the piston and cylinder assembly 32 will typically be mounted within a structural pillar 83, shown in FIG. 4, forming part of the seat back 33.

A crash detecting logic unit 48 determines whether the pyrotechnic charge 42 should be activated. Upon activation, the pyrotechnic charge 42 combusts to produce a volume of gas. The gas, trapped within the combustion chamber 46, pushes the piston 28 upwardly in the piston cavity 40 to expand the combustion chamber 46.

As shown in FIG. 2, as the piston 28 is pushed upwardly, the belt guide 26 travels upwardly from a first lower position 52 to a second upper position 53, pulling two segments 64, 66 of belt 24 upwardly to remove slack from the safety belt. A first segment 64 extends from the belt guide 26 forwardly across the seat 22 to a buckle 67 which is mounted to a seat base portion 69. A second segment 66 extends from the belt guide 26 downwardly into the seat 22. As the piston 28 is pushed up into the piston cavity 40, these two segments 64, 66 of belt 24 are pulled upwardly. It should be noted that, because the second segment 66 extends into the retractor 36, and because the retractor will be locked in the event of a crash event, there will usually be minimal slack in the second segment, hence the upward travel of the of the piston 28 will primarily remove slack in the first segment 64 across the seat occupant.

Since two segments 64, 66 of the belt 24 are affected by the piston extension, the seat belt safety system 20 of this invention removes slack at approximately twice the rate which the piston 28 travels through the cylinder 30. As shown in FIG. 2, when the belt guide 26 is raised a distance $P_t$, the belt path is elongated a distance roughly equal to $2P_t$. The exact relationship between piston 28 stroke and change in belt path length will depend on the departure angles of the belt 24 away from the guide 26.

As shown in FIGS. 3 and 4, the belt guide 26, also called a "web guide" or a "D-ring," typically will comprise a box-shaped bracket 54, an axial member 56 mounted to the bracket, and a conical spool 58 with a through bore. The spool 58 has an inner surface 60 which rotates about an axis and an outer belt engaging surface 62. The bracket 54 includes openings to receive an axial member 56 which rotatably mounts the conical spool 58 to the bracket 54. The lower portion of the bracket has two legs 182 which extend downwardly on opposite sides of the piston first end 38. Each leg 182 transitions into a shoulder 184 with a mounting hole 186.

A U-shaped support 188 fits in the box-shaped bracket 54. A plurality of fasteners 189 extend through mounting holes 190 in the U-shaped support to secure the U-shaped support 188 to the bracket 54. The fasteners 189, commonly called "Christmas tree" fasteners, have a plurality of deformable outer rings. Securing the U-shaped support 188 to the shoulders 184 ensures that the bracket legs 182 will not separate. The U-shaped support 188 has a second set of mounting holes 192 for fastening the belt guide assembly 26 to the piston first end 38. A plurality of fasteners extend through the U-shaped support 188 into a set of complementary mounting holes 194 in the piston first end 38.

The upper limit of the piston stroke is determined by a U-shaped stop 84 which is secured within the cylinder 30. The U-shaped stop 84 is inserted through a slit 86 in the cylinder 30, positioned so that a portion 88 of the stop 84 extends across the piston cavity 40. When the piston 28 is pushed up within the cylinder 30, an upwardly facing shoulder 90 on the piston hits the U-shaped stop 84 to limit the piston 28 extension.

To prevent reintroduction of slack in the belt system, the system prevents collapse of the piston into the cylinder. Two wedges 94, shown in FIG. 4, engage the inner wall 96 of the cylinder 30 to produce a retraction resistance force 98. The wedges 94 are slidably disposed in a pair of horizontal slots 100 which extend through the piston 28. An upwardly facing surface 102 on each wedge 94 is spaced from a parallel opposed surface 104 formed on the piston 28. When the forces applied to the belt urge the piston downwardly after the pyrotechnic charge has been exhausted, the inclined sides of the wedges engage the inclined faces 106 on the piston, moving the wedges from a first position against a first surface 108 to a second position against the opposed surface 104. This motion of the inclined surfaces drives the edges of the wedges perpendicularly outwardly from the piston to engage the cylinder cavity walls and prevent collapse of the piston. Each wedge has a wall engaging edge 111 with a row of teeth 112. The teeth 112 extend toward the inner cylinder wall 96.

Sliding the piston 28 upwardly biases the wedges 94 toward the first, inner surface 108. In this position, the wedges 94 offer little resistance to the upward displacement of the piston 28.

Sliding the piston 28 downwardly engages the row of teeth 112 on the cylinder wall 96, which biases the wedges 94 toward the second, outer position against the opposed surface 104. As the wedges 94 are pushed outwardly from the piston 28, the teeth 112 are forced into the cylinder wall 96. The engagement of the teeth 112 in the wall 96 creates an upwardly directed force 98 which is transferred through the wedge to the piston 28.

Load limiting, that is allowing additional slack to be fed into the safety belts to limit maximum load is typically provided by a mechanism which is separate from the belt tightening function, such mechanisms are well known by those skilled in the art. However the system 20 may provide a load limiting function. After the piston 28 has extended to pretension the belt 24, the seat belt safety system 20 begins a collapse of the piston back into the cylinder 30. The piston 28 retraction permits a portion 92 of the belt 24 to extend forwardly, relieving tension in the belt and extending the duration of the restraining forces acting on the seat occupant 72.

The piston 28 collapse occurs when the downward component of the belt force 114 exerted on the piston 28 overcomes the resistance created by the teeth 112 engaged on the wall 96, and therefore the piston is pushed down the piston cavity 40. As the piston 28 travels downwardly, each tooth 112 cuts a groove 116 in the cylinder inner wall 96. The plastic deformation of the wall 96 absorbs energy of the impact, thereby reducing the energy absorbed by the seat occupant 72.

It should be noted that the cylinder 30 and shoulder belt guide 26 may be vertically adjustable, and that the vertical adjustment of the cylinder and belt guide may be linked to vertical adjustment of a headrest, not shown. In an alternative embodiment of assembly 196, shown in FIG. 7, the exterior of the cylinder has a geared rack portion 176 with a plurality of gear teeth 177. A worm gear 174 is mounted to the structural pillar 83 and engages with the geared rack 176. A DC motor 178 drives the worm gear 174, which drives the geared rack 176 to raise or lower the cylinder 30. The DC motor 178 is controlled by an occupant-activated switching mechanism 180. Depending on the state of the switching mechanism 180, the DC motor 178 will turn clockwise or counter clockwise to raise or lower the cylinder and belt guide 26 as desired by the occupant. The headrest may be mounted to the cylinder 30, so that the headrest position and belt guide 26 position may be simultaneously adjusted.

It should be understood that although the piston is shown as rectangular in shape and employs captive wedges to prevent or resist retraction of the piston under load, a plurality of ball bearings captive in a cage and positioned between a conical surface abutting a cylindrical piston could be used to form a jam locking mechanism by selecting a conical angle so the balls are driven downwardly to wedge between the conical surface and the piston. A similar mechanism using a polygonal piston with downwardly sloping conical or planar surfaces could be used.

It should also be understood that although a pyrotechnic gas generator is described, a compressed gas container operating with a gas piston could be used. Further, a spring actuated piston could be employed.

It should be further noted that although the seat belt safety system 20 is shown with all components integrated into the vehicle seat 22 assembly, several components may be isolated from the seat. For example, the pyrotechnic piston and cylinder assembly 32 may be mounted to the vehicle body and the web guide 26 positioned in the B-pillar or C-pillar of the vehicle.

It is understood that the invention is not limited to the particular construction and arrangement of parts herein illustrated and described, but embraces such modified forms thereof as come within the scope of the following claims.

What is claimed is:

1. A safety system for protecting an occupant comprising:
   a three-point belt system (23) comprising a retractor (36) lockable in an emergency, a seat belt (24) divided into a shoulder belt portion (34) and a lap belt portion (35), a tongue (37) situated on the seat belt (24), the tongue lockable with a buckle (67), the shoulder belt portion (34) extending over a web guide (26), the system (24) being disposable about the occupant with some degree of slack;
   first means, associated with the web guide for vertically moving the web guide, the first means, including occupant controllable means, responsive to an occupant input, for moving the web guide to a desired vertical position during a non-emergency condition and belt tightening means (20) for moving the web guide (26) upwardly, during an emergency, from the position established by the occupant movable means, to reduce the slack.

2. The device as defined in claim 1,
   wherein the occupant controllable means includes a moveable housing operatively linked to the web guide and wherein the belt tightening means (20) includes a piston (28) slidingly received in the housing (30), and forcing means (42) for causing the piston to move rapidly upward.

3. The device as defined in claim 2 wherein the housing is movable relative to a support member (30) that is part of a structural frame of a vehicle seat (22).

4. A safety system for protecting an occupant comprising:
   a three-point belt system (23) comprising a retractor (36) lockable in an emergency, a seat belt (24) divided into a shoulder belt portion (34) and a lap belt portion (35), a tongue (37) situated on the seat belt (24), the tongue lockable with a buckle (67), the shoulder belt portion (34) extending over a web guide (26), the system (24) being disposable about the occupant with some degree of slack;
   belt tightening means (20) for moving the web guide (26) upwardly to reduce the slack including a piston (28) slidingly received in a housing (30) and operatively linked to the web guide (26) and forcing means (42) for causing the piston to move rapidly in a first direction outwardly from the housing; and
   one-way clutch means (94) for permitting the piston (28) to move in the first direction but preventing substantial movement in an opposite second direction.

5. A seat belt safety system comprising:
   a vehicle seat (22) having a seat back portion (33);
   a housing (30) mounted to the seat back portion (33), the housing (30) further having an inner wall (96) defining a piston cavity;
   a piston (28) slidably mounted within the piston cavity, the piston (28) having an elongated body, a first end of the piston protruding upwardly out of the piston cavity, a second end of the piston located within the piston cavity;
   a one-way clutch, located between the piston and the inner wall of the housing, which when activated braces the piston again the inner wall of the housing preventing downward motion of the piston when loaded by a force, the one-way clutch including energy absorbing means for permitting the controllable downward motion of the piston to move after a downward force of a determinable level acts on the piston, wherein the energy absorbing means dissipates energy as the piston moves downwardly;
   a safety belt guide (26) mounted to the piston first end (38);
   a three-point safety belt (24) including a shoulder belt portion and a lap belt portion, the shoulder belt portion operatively supported by the safety belt guide and when under load, exerts a downward force on the piston to activate the one-way clutch.

6. The system as defined in claim 5 further including forcing means (42) for causing the piston to move rapidly in a first direction outwardly from the piston cavity.

7. The system as defined in claim 6 further including belt tightening means (20) for moving the piston and the web guide attached thereto to a user defined vertical position.

8. A seat belt safety system comprising:
   a vehicle seat (22) having a seat back portion (33);
   a cylinder housing (30) mounted to the seat back portion (33), the cylinder housing (30) having a first upwardly facing end, a second downwardly facing end contained within the seat back portion (33), and an inner cylinder wall (96) extending downwardly from the first upwardly facing end, the inner cylinder wall defining a piston cavity;

a piston (28) slidably mounted within the piston cavity, the piston (28) having an elongated body, the body having a piston first end (38) and a piston second end (44) opposite the piston first end, the piston first end protruding upwardly out of the piston cavity, and the piston second end (44) contained within the housing (30);

portions of the piston defining a slot (100), the slot oriented perpendicular to the direction the piston slides, the slot having a first upper surface (104), a second lower surface, and a third surface (106) facing downwardly and outwardly from the piston sliding axis;

a wedge (94) slidably disposed in the slot (100), the wedge having a first upper surface (102), a second lower surface, a third sliding surface, and a fourth surface, the first upper surface (102) spaced from the slot upper surface by a gap, the second lower surface abutted against the slot lower surface, the third sliding surface abutted against the slot third surface, and the fourth surface extending outwardly and downwardly toward the inner cylinder wall (96), the fourth surface meeting the inner cylinder wall at a wall engaging edge (111);

a safety belt guide (26) mounted to the piston first end (38);

a safety belt (24) having a shoulder belt segment, operatively support by the safety belt guide, and a lap belt segment, wherein a downward component (114) of the tension in the safety belt biases the piston downwardly, and wherein the wall engaging edge (111) engages the inner cylinder wall (96), biasing the wedge (94) to further engage the wedge into the inner cylinder wall (96), and wherein the engagement of the wedge and the cylinder creates an upwardly directed force, and wherein the sum of the upwardly directed force and the downward component of the tension in the safety belt is a downwardly directed force, and wherein the downwardly directed force causes the piston (28) to retract into the housing (30), and wherein the inner cylinder wall (96) absorbs energy from the safety belt (24) as the piston (28) retracts to allow a portion of the safety belt (24) to extend away from the guide (26), thereby relieving tension in the seat belt safety system.

9. The seat belt safety system of claim 8 wherein the wedge (94) has portions defining a plurality of grooves in the fourth surface, the grooves extending downwardly toward the wall engaging edge (111) and intersecting the wall engaging edge (111) to define a plurality of teeth (112), and wherein the teeth (112) cut a plurality of grooves (116) in the inner cylinder wall (96) as the piston (28) is pushed downwardly into the cylinder (30).

10. An automobile seat belt safety system comprising:

a vehicle seat (22) having a seat base portion (69) and a seat back portion (33) extending upwardly from the seat base portion (69);

a piston (28) engaged within a cylinder (30) in an assembly (32) fixed with respect to the vehicle seat, the piston (28) having a first, retracted configuration, and a second, extended configuration with respect to the cylinder (30);

a shoulder belt guide (26) mounted to the piston, the shoulder belt guide having a belt engaging surface (62);

a seat belt retractor fixed with respect to the seat at a location below the shoulder belt guide, the retractor configured to lock an attached belt in the event of a crash event; and a safety belt (24) engaged on the belt engaging surface (62), the belt (24) having two belt segments (64, 66) extending away from the safety belt guide (26), a first belt segment (64) extending from the belt guide frontwardly and downwardly across the seat back portion (33), and a second belt segment (66) extending downwardly from the belt engaging surface to attach to the seat belt retractor, wherein actuating the piston and cylinder assembly (32) from the first, retracted, configuration to the second, extended, configuration raises the belt guide (26) and lengthens the first belt segment (64) and the second belt segment (66), thereby removing slack from the safety belt (24).

11. The seat belt safety system of claim 10 wherein a piston and cylinder assembly is mounted to the seat, and wherein the second belt segment (66) extends downwardly into the seat (22).

12. The seat belt safety system of claim 10 wherein a pyrotechnic charge (42) actuates the piston and cylinder assembly (32).

13. The seat belt safety system of claim 10 wherein the shoulder belt guide (26) comprises a spool (58) rotatably connected to a member (56), the spool (58) having an inner surface (60) which rotates about an axis and an outer belt engaging surface (62).

14. The seat belt safety system of claim 10 wherein the shoulder belt guide (26) is mounted to the piston (28).

* * * * *